US009482875B2

(12) United States Patent
Vermeirsch et al.

(10) Patent No.: US 9,482,875 B2
(45) Date of Patent: Nov. 1, 2016

(54) POLARIZATION PRESERVING DLP OPTICAL ARCHITECTURE

(75) Inventors: Koenraad Vermeirsch, Bellegem (BE); Peter Janssens, Ghent (BE); Dirk L. A. Maes, Wevelgem (BE)

(73) Assignee: Barco N.V., Kortrijk (BE)

( * ) Notice: Subject to any disclaimer, the term of this patent is extended or adjusted under 35 U.S.C. 154(b) by 0 days.

(21) Appl. No.: 14/116,945

(22) PCT Filed: May 14, 2012

(86) PCT No.: PCT/EP2012/058900
§ 371 (c)(1),
(2), (4) Date: Nov. 11, 2013

(87) PCT Pub. No.: WO2012/156357
PCT Pub. Date: Nov. 22, 2012

(65) Prior Publication Data
US 2014/0085609 A1    Mar. 27, 2014

(30) Foreign Application Priority Data

May 13, 2011    (GB) .................................. 1108000.9

(51) Int. Cl.
*G03B 21/14*    (2006.01)
*G02B 27/26*    (2006.01)
(Continued)

(52) U.S. Cl.
CPC ............. *G02B 27/26* (2013.01); *G02B 27/286* (2013.01); *G03B 21/008* (2013.01);
(Continued)

(58) Field of Classification Search
USPC ........ 353/7, 8, 20; 352/62; 349/15; 359/465, 359/464, 483, 485, 487, 495, 489.07; 348/57, 58; 362/19
See application file for complete search history.

(56) References Cited

U.S. PATENT DOCUMENTS 5,777,789 A     7/1998  Chiu
5,986,815 A  *  11/1999  Bryars ................. G02B 27/145
                                                    348/E9.027
(Continued)

FOREIGN PATENT DOCUMENTS

WO    WO 2008/048494    4/2008

OTHER PUBLICATIONS

Chinese Office Action for corresponding Chinese patent application No. 201280025076.9 dated Jun. 3, 2015 (English translation included).

*Primary Examiner* — William C Dowling
(74) *Attorney, Agent, or Firm* — Renner, Otto, Boisselle & Sklar LLP

(57) ABSTRACT

A DLP optical structure and corresponding method of controlling it are described including an optical integrator system having an optical integrator, a relay lens system, a TIR prism assembly, a digital imager, and a projection lens, said optical structure being adapted to accept a polarized light beam, said DLP optical structure comprising: at least one retarder positioned after said optical integrator for controlling the polarization state throughout said DLP optical structure, and achieving the desired polarization state after said projection lens; wherein said desired polarization state is substantially linear or circular. A DLP optical structure is also described including an optical integrator, a relay lens system, a TIR prism assembly, a digital imager and a projection lens, wherein the integrator is a fly-eye integrator for maintaining an input polarization of a light beam, and wherein said input polarization is linear or circular. DLP optical structures for use with a digital imager and a projection lens are also described, substantially as above but not including the features of the digital imager and projection lens.

13 Claims, 7 Drawing Sheets

(51) Int. Cl.

| | | |
|---|---|---|
| *G02B 27/28* | (2006.01) | |
| *H04N 9/31* | (2006.01) | |
| *G03B 21/00* | (2006.01) | |
| *G03B 21/20* | (2006.01) | |
| *G03B 35/26* | (2006.01) | |
| *G03B 21/28* | (2006.01) | |
| *G02B 27/09* | (2006.01) | |
| *G02B 27/10* | (2006.01) | |
| *H04N 13/04* | (2006.01) | |

(52) U.S. Cl.
CPC ......... *G03B 21/2073* (2013.01); *G03B 21/28* (2013.01); *G03B 35/26* (2013.01); *H04N 9/3167* (2013.01); *G02B 27/0961* (2013.01); *G02B 27/1026* (2013.01); *H04N 13/0427* (2013.01); *H04N 13/0434* (2013.01); *H04N 13/0459* (2013.01)

(56) References Cited

U.S. PATENT DOCUMENTS

| | | | |
|---|---|---|---|
| 5,993,004 A * | 11/1999 | Moseley et al. | 353/8 |
| 6,250,762 B1 | 6/2001 | Kuijper | |
| 6,478,429 B1 * | 11/2002 | Aritake et al. | 353/31 |
| 6,540,359 B1 * | 4/2003 | Cornelissen et al. | 353/20 |
| 6,783,241 B2 * | 8/2004 | Miyawaki | G02B 27/1026 348/E5.141 |
| 6,832,836 B2 * | 12/2004 | Yatsu et al. | 353/20 |
| 7,070,280 B2 * | 7/2006 | Edlinger et al. | 353/20 |
| 7,159,989 B2 * | 1/2007 | Yano | 353/81 |
| 2002/0191297 A1 | 12/2002 | Gleckman | |
| 2003/0151723 A1 * | 8/2003 | Florence | 353/20 |
| 2006/0092380 A1 * | 5/2006 | Salsman et al. | 353/20 |
| 2006/0171030 A1 * | 8/2006 | Umeya | 359/502 |
| 2006/0232750 A1 * | 10/2006 | Yokote | 353/20 |
| 2006/0250582 A1 * | 11/2006 | Piehler | 353/20 |
| 2009/0021699 A1 * | 1/2009 | Hsu et al. | 353/20 |
| 2009/0141242 A1 | 6/2009 | Silverstein | |
| 2009/0284713 A1 | 11/2009 | Silverstein | |
| 2010/0315596 A1 * | 12/2010 | Yoon | 353/20 |
| 2010/0328614 A1 * | 12/2010 | Ikeda et al. | 353/20 |
| 2011/0019153 A1 * | 1/2011 | Lee et al. | 353/8 |
| 2012/0170001 A1 * | 7/2012 | Sawai | 353/20 |
| 2013/0088688 A1 * | 4/2013 | Read et al. | 353/8 |
| 2014/0085609 A1 * | 3/2014 | Vermeirsch et al. | 353/8 |
| 2014/0333900 A1 * | 11/2014 | Aboshi et al. | 353/20 |

* cited by examiner

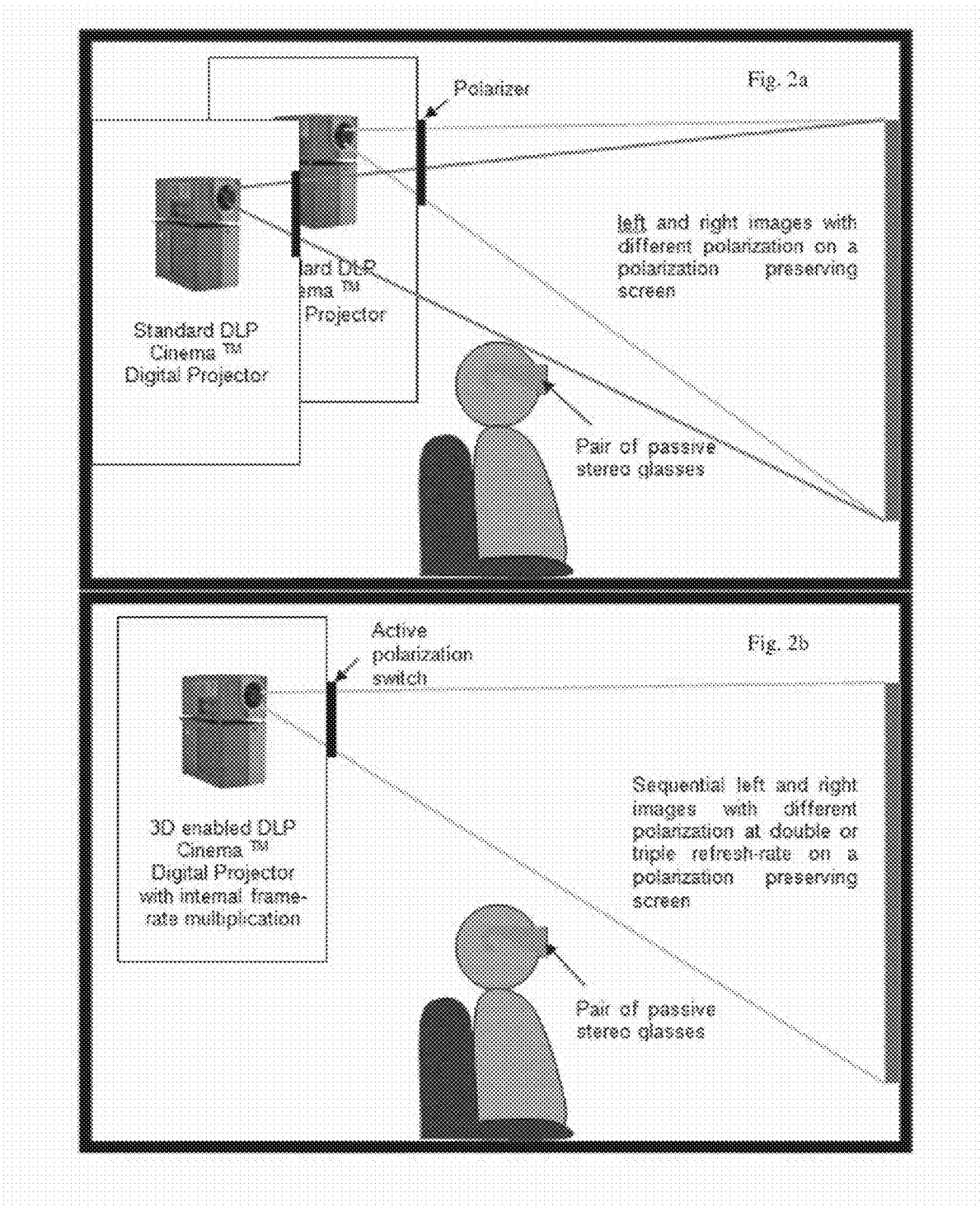

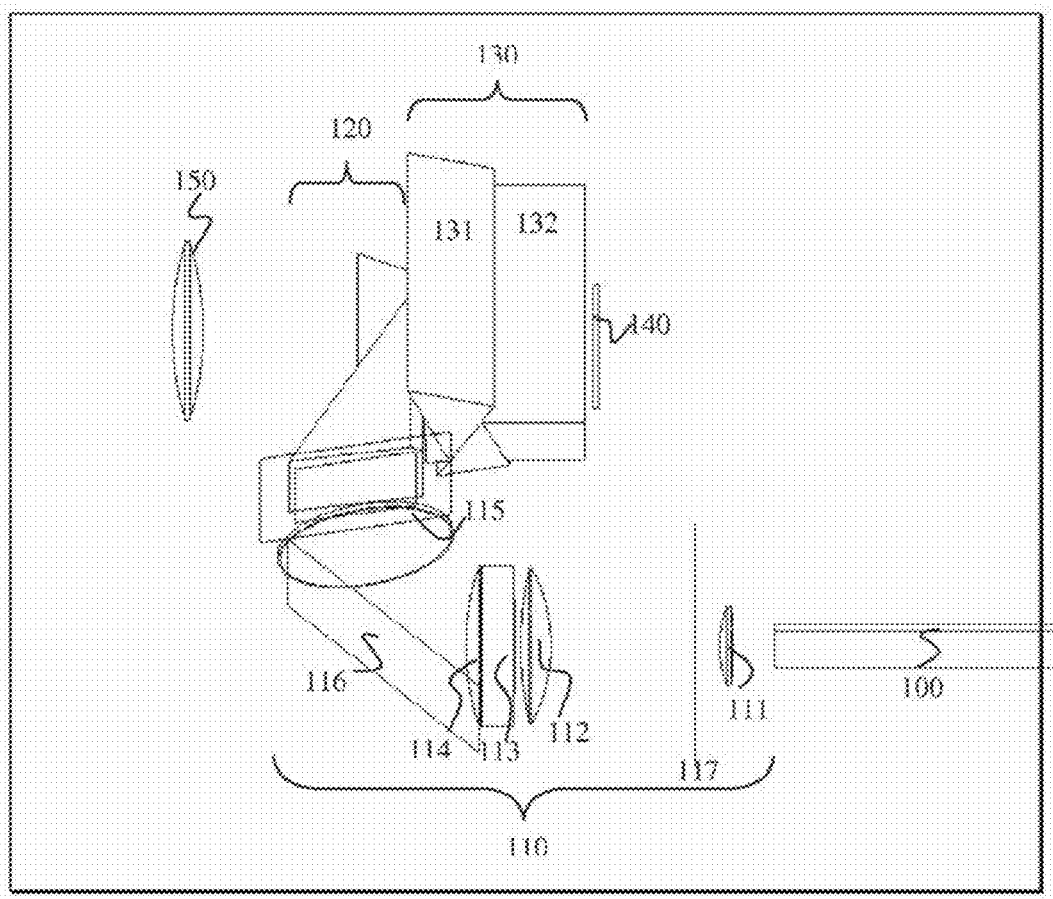
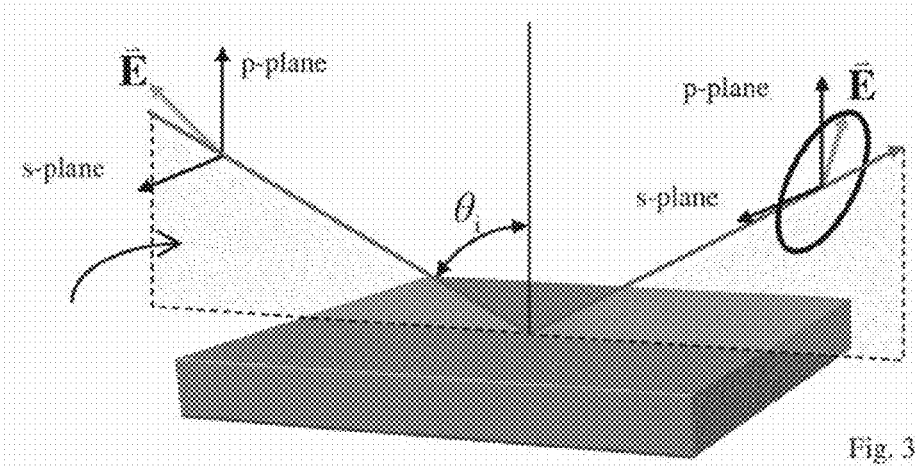
Fig. 3a
Fig. 3b

POLARIZATION PRESERVING DLP OPTICAL ARCHITECTURE

CROSS-REFERENCE TO RELATED APPLICATIONS

This application is a §371 national stage entry of International Application No. PCT/EP2012/058900, filed on May 14, 2012, which claims priority to Great Britain Patent Application No. 1108000.9, filed May 13, 2011, the entire contents of which are incorporated herein by reference.

The present invention relates to digital light processing methods and, more particularly, to a polarization preserving DLP optical architecture, a projector, and optical components for use in the projector.

TECHNICAL BACKGROUND

Contrary to liquid crystal based projection displays, the Texas instruments DLP™ (digital light processing) does not require polarized light to operate. Rather the modulation of light is based on angular deflection of the light beam per pixel. And special optical architectures have been developed to couple the light from the lamp towards the DLP at the correct angle using total internal reflection (TIR) in special prism architectures. See FIG. 1 in which a lamp is shown directing light through a TIR prism to a DMD back to the prism and then to a projection lens.

Stereoscopic projection solutions have been developed based on polarization of light. Using a polarization preserving screen the left eye image is projected using one polarization state while the right eye image is projected using an orthogonal polarization state. The user wears polarizer glasses to pass only the appropriate image to the respective eye. Solutions with two projectors using passive polarization filters as well as single projector solutions using active polarization switches have been developed. See FIG. 2.

However in both cases when the light coming from the projector is unpolarized, half of the available light output is blocked. Complex optical systems have been proposed to recuperate the lost light (WO2008048494). But those add significant cost and difficulties to converge the two images with different polarizations to overlap on the projection screen.

It would be advantageous if a DLP projector could be adapted to deliver polarized light in an efficient way. This is especially valid if the light source is already polarized, which is the case for instance when laser illumination is used inside the projector. In this case, it would be sufficient to maintain the polarization throughout the optical path of the projector to enable efficient stereoscopic projection based upon polarization.

When looking at the light path of a DLP projector different elements can be identified from the light source to the projection lens 150. The light from the light source is coupled to an optical integrator 100 such as an integrator rod. At the exit of the optical integrator 100 such as an integrator rod a uniform light spot is achieved. This light spot is then imaged onto the DMD imager or imagers 140 by means of the relay lens system 110. The relay lens system consists of various individual lens elements (in this example 111 till 115) and can optionally also contain 1 or more folding mirrors 116 and an aperture 117. The TIR prism assembly 120 sends the light towards the DMD imager(s) 140. When a multi-chip architecture is used a color splitting prism 130 is placed between the TIR prism assembly 120 and the imagers 140. The color prism assembly will split the light in at least 2 spectral components, send it to the respective imager 140 and recombine the at least 2 spectral components into a single output beam towards the projection lens 150.

Even if the light at the entrance of the optical integrator is linearly polarized, this does not guarantee that the light from the projection lens will also be linearly polarized. The different components of the optical path can, and without special measures will, affect the polarization properties of the light.

When light reflects at an angle from an interface between two transparent materials, the reflectivity is different for light polarized in the plane of incidence and light polarized perpendicular to it. Light polarized in the plane of incidence is said to be p-polarized, while that polarized perpendicular to it is s-polarized. As a result a linearly polarized input beam is converted to an elliptically polarized reflected beam.

With reference to FIGS. 3a and b it is clear that such total internal reflection will occur in the TIR prism assembly 120 and that linearly polarized light can be changed to elliptically polarized light when the polarization direction does not coincide with the s- or p-plane.

Also, in the color prism assembly 130, multiple TIR reflections will occur. The color prism assembly will include 1 prismatic element per primary color onto which the DMD device 140 for that specific color is attached. For example the color prism includes a prismatic element 131 onto which the blue DMD is attached, a prismatic element 132 onto which the red DMD is attached and a prismatic element 133 onto which the green DMD is attached. The surface of the blue prism 131 adjacent to the red prism 132 is covered with a dichroic coating that will reflect the blue light and passes the red and green light. The surface of red prism 132 adjacent to the green prism is covered with a dichroic coating that will reflect the red light and passes the green light. By changing the characteristics of the dichroic coatings a certain prism element can be dedicated to process another color. For example it is possible to define the coatings such the prism element 131 becomes dedicated to the red color and prism element 132 becomes dedicated to the blue color.

With reference to FIGS. 4 to 6 the green light is transmitted through the color prism in a straight path passing through the dichroic coatings on the blue and red prisms at surfaces 131b and 132b. The reflected light follows a similar path. The reflected on-state green light 510c is incident on the dichroic coating surfaces 131b and 132b in a plane perpendicular to those surfaces. Therefore, when the reflected on-state green light 510c is incident on the dichroic coating at surface 132b with linear polarization in the s-plane or p-plane, then this condition will at the same time be met on the dichroic coating at surface 131b and the polarization will remain unaffected. The transmitted green light 500c however passes these dichroic coated surfaces under an angle (as can be seen from the side view of the prism). It then becomes impossible to define a polarization direction that lies in either the s- or p-plane for both surfaces at the same time. As a result it was found that those dichroic coatings convert the polarization state of the transmitted green beam 500c to a general elliptical polarization state.

The blue transmitted light 500a first reflects of the dichroic coating on the surface 131b and then is reflected via TIR on surface 131a, a similar path in reverse order is followed by the reflected blue light 510a. While the plane of incidence for the reflected on-state blue light 510a is perpendicular to the prism surfaces 131a and 131b, the transmitted blue light 500a hits the prism under an angle. As a result it was found that the TIR reflection has a slight polarization changing effect on the transmitted blue beam 500a.

The red transmitted light 500b first passes through the dichroic coating on the blue prism at surface 131b. It is then separated from the green light by the dichroic coating at surface 132b and reflected by TIR at surface 132a. A similar path in reverse order is followed by the reflected red light 510b. Also here the plane of incidence onto the prism surfaces 131b, 132b and 132a for the reflected on-state red light 510b is perpendicular. While again the transmitted red beam 500b will be incident on those surfaces at an angle. And hence a combination of polarization conversion by the dichroic coating and by the TIR was found.

The above statements that the reflected on-state light 510 hits the respective prism surfaces in a plane perpendicular to those surfaces is only valid for a perfectly collimated transmitted illumination bundle 500. For practical setups with an illumination bundle of a finite f-number (typically f #2.5 for a DMD device with 12 degrees tilt angle) also the reflected on-state light will experience some polarization change.

SUMMARY OF THE INVENTION

Embodiments of the present invention provide a DLP optical structure including an optical integrator system having an integrator, a digital imager, and a projection lens, said optical structure being adapted to accept a polarized light beam. The DLP structure may also include a relay lens system and a TIR prism assembly located after the integrator. The DLP optical structure may comprise further:
  at least one retarder positioned after said optical integrator for controlling the polarization state throughout said DLP optical structure, and achieving the desired polarization state after said projection lens;
  wherein said desired polarization state is substantially linear or circular.

The retarder may be located at various positions. For example the at least one retarder can be positioned between the exit of said optical integrator and said TIR prism. The polarization of said light beam at the TIR prism reflective surface can be then determined, e.g. substantially linear and substantially s- or p-oriented or substantially circular.

Alternatively said at least one retarder can be positioned between the exit of said optical integrator such as an integrator rod and a folding mirror included in said relay lens system, wherein the light incident on said folding mirror has a polarization state that is substantially linear and substantially s- or p-oriented or substantially circular, and wherein the plane of said folding mirror is perpendicular to the surface of said TIR prism.

Yet further, the at least one retarder can be placed in front of or after said projection lens for changing the elliptical polarization back to the desired polarization, said desired polarization state being substantially linear or circular.

Optionally a first retarder can be used to convert elliptical polarized light into linear light, and a second retarder can be used to change the direction of said linear polarization or convert it to circular polarization. One of these first and second retarders can be a homogeneous broadband half wave retarder, and the other one of the first and second retarders can be a homogeneous broadband quarter wave retarder. These first and said second retarders can both be homogeneous broadband quarter wave retarders.

As a further embodiment the at least one retarder can be positioned between said TIR prism and said digital imager, and a light beam passes twice through said retarder for providing light with said desired polarization state to said projection lens.

The DLP optical structure as described above can comprise a color splitting assembly, wherein said at least one retarder includes at least one color selective retarder, selected to achieve said desired polarization state after said projection lens for all primary colors.

Alternatively, the DLP optical structure described above can have a color splitting assembly, wherein said at least one retarder is placed between said color splitting prism and said digital imager, wherein said light beam passes twice through said at least one retarder for achieving said desired polarization state after said projection lens for all primary colors.

In any embodiment of a DLP optical structure according to the present invention the digital modulator can be a DMD.

In an alternative aspect the present invention can provide a DLP optical structure including an optical integrator system, a digital imager, and a projection lens, comprising:
  a fly-eye integrator system for maintaining an input polarization of said light beam regardless of the orientation versus the symmetry axes of said fly-eye integrator system; and
  wherein said input polarization is linear or circular and selected to be substantially aligned or substantially with the s- or p-plane of the reflective surface of the TIR prism.

The DLP structure may also comprise a relay lens system and a TIR prism assembly.

In any of the embodiments of the DLP optical structure according to the present invention at least one clean-up polarizer can be placed in the path of said light beam before and/or after said at least one retarder.

The present invention also provides a DLP projector comprising a DLP optical structure according to any of the embodiments of the present invention. The DLP projector can comprise a laser light source. The DLP projector may comprise according optionally a 3D polarization switching system. Such a DLP projector may comprise a clean-up polarizer included in said 3D polarization switching system.

The present invention also provides a method for controlling the polarization state throughout a DLP optical structure, and achieving the desired polarization state after the projection lens, said desired polarization state being substantially linear or circular,
  comprising the steps of:
  positioning at least one retarder at a first position within said DLP optical structure; and
  converting elliptical polarized light into substantially linear or circular polarized light.

The method may also include:
  positioning at least one additional retarder at an additional position; and
  changing the direction of said linear polarization or converting said linear polarization to circular polarization.

In the method at least one of said retarders can be replaced with a color selective retarder.

The method may further comprise the steps of:
  inserting at least one clean-up polarizer in said DLP optical structure; and
  enhancing the contrast of an image.

In a further aspect the present invention provides a DLP optical structure for use with a digital imager and a projection lens, the DLP optical structure comprising an optical integrator system having an optical integrator, said optical structure being adapted to accept a polarized light beam, said optical structure further comprising:

at least one retarder positioned after said optical integrator for controlling the polarization state throughout said DLP optical structure;

wherein said desired polarization state is substantially linear or circular.

The DLP structure can include a relay lens system, and a TIR prism assembly located after the integrator.

For such a DLP structure the at least one retarder can be positioned between the exit of said optical integrator and said TIR prism, and the polarization of said light beam at the TIR prism reflective surface can be substantially linear and substantially s- or p-oriented or substantially circular.

In such a DLP optical structure the at least one retarder can be positioned between the exit of said optical integrator and a folding mirror included in said relay lens system, wherein the light incident on said folding mirror has a polarization state that is substantially linear and substantially s- or p-oriented or substantially circular, and wherein the plane of said folding mirror is perpendicular to the surface of said TIR prism.

Optionally the at least one retarder can be placed at a position that is in front of the projection lens for changing the elliptical polarization back to the desired polarization, said desired polarization state being substantially linear or circular.

In the DLP optical structure a first retarder can be used to convert elliptical polarized light into linear light, and a second retarder can be used to change the direction of said linear polarization or convert it to circular polarization. One of said first and second retarders can be a homogeneous broadband half wave retarder, and the other one of said first and second retarders can be a homogeneous broadband quarter wave retarder. Alternatively said first and said second retarder, can both be homogeneous broadband quarter wave retarders.

In yet another embodiment said at least one retarder can be positioned between said TIR prism and said digital imager, and the DLP optical structure is adapted do that a light beam can pass twice through said retarder to provide light with said desired polarization state to the projection lens.

Such a DLP optical structure as described above according to any of the embodiments of the invention can also comprise a color splitting assembly, wherein said at least one retarder includes at least one color selective retarder, selected to achieve said desired polarization state after said projection lens for all primary colors.

Alternatively, the SLP structure can further comprise a color splitting assembly, wherein said at least one retarder is placed between said color splitting prism and said digital imager, wherein said light beam passes twice through said at least one retarder, the DLP optical structure being adapted for achieving said desired polarization state after said projection lens for all primary colors.

The DLP optical structure according to any of the above embodiments can include a digital modulator such as a DMD.

In a further embodiment the present invention provides a DLP optical structure for use with a digital imager, and a projection lens, the DLP optical structure comprising an optical integrator system, and:

a fly-eye integrator system for maintaining an input polarization of said light beam regardless of the orientation versus the symmetry axes of said fly-eye integrator system; and wherein said input polarization is linear or circular and selected to be substantially aligned or substantially with the s- or p-plane of the reflective surface of the TIR prism.

The DLP structure can include a relay lens system and a TIR prism assembly located after the integrator.

Any such DLP optical structure as described above can include at least one clean-up polarizer placed in the path of said light beam before and/or after said at least one retarder.

BRIEF DESCRIPTION OF THE DRAWINGS

FIGS. 2a and b show conventional DLP projectors that use polarized light for 3D effects.

FIG. 3a shows a conventional DLP projector with an integrator rod, a relay lens system, DMD imagers, a TIR prism, a projection lens—a basic arrangement that can be used with embodiments of the present invention. FIG. 3b illustrates polarization of light after reflection from an interface between two transparent materials.

Corresponding reference characters indicate corresponding parts throughout the several views. The exemplification set out herein illustrates exemplary embodiments of the invention, in one form, and such exemplification is not to be construed as limiting the scope of the invention in any manner.

DETAILED DESCRIPTION OF THE EMBODIMENTS

Figure 1:
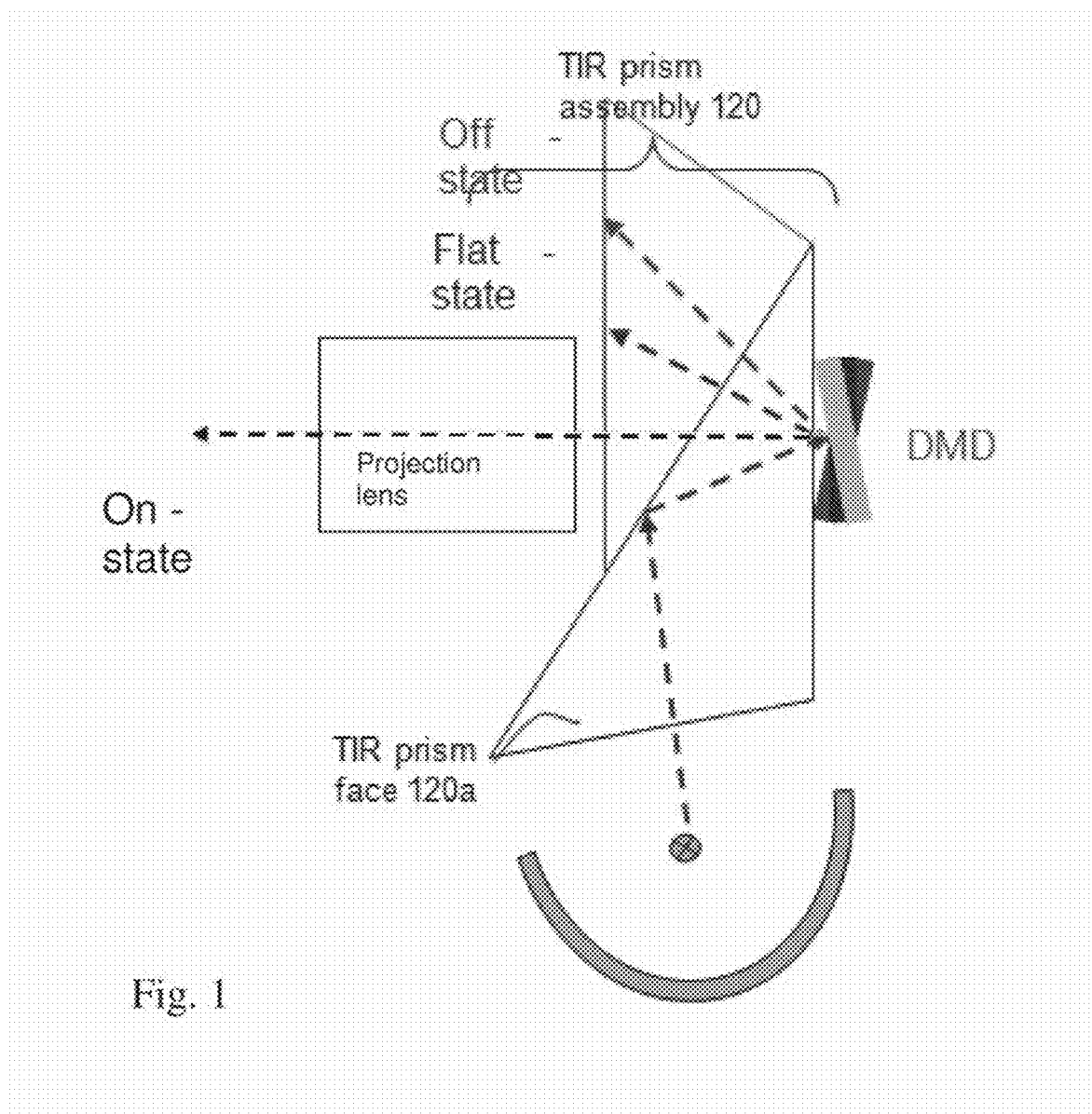
FIG. 1 shows a conventional DLP projector with a lamp, a TIR prism, a DMD a projection lens—a basic arrangement that can be used with embodiments of the present invention.

The present invention will be described with respect to particular embodiments and with reference to certain drawings, but the invention is not limited thereto but only by the claims. The drawings described are only schematic and are non-limiting. In the drawings, the size of some of the elements may be exaggerated and not drawn on scale for illustrative purposes. Where the term "comprising" is used in the present description and claims, it does not exclude other elements or steps. Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The present invention will be described as modifications to the apparatus shown schematically in FIGS. 3 to 6 and described above as well as FIG. 7. Corresponding parts below indicate corresponding parts throughout the several views described above with the addition of further novel and inventive features. The exemplification set out herein illustrates exemplary embodiments of the invention, in one form, and such exemplification is not to be construed as limiting the scope of the invention in any manner.

Embodiments of the present invention provide a DLP projector adapted to deliver polarized light in an efficient way. Embodiments of the present invention can be used with a light source that is already polarized, which is the case for instance when laser illumination is used inside the projector. Embodiments of the present invention maintain the polarization throughout the optical path of the projector to enable efficient stereoscopic projection based upon polarization.

Figure 5:
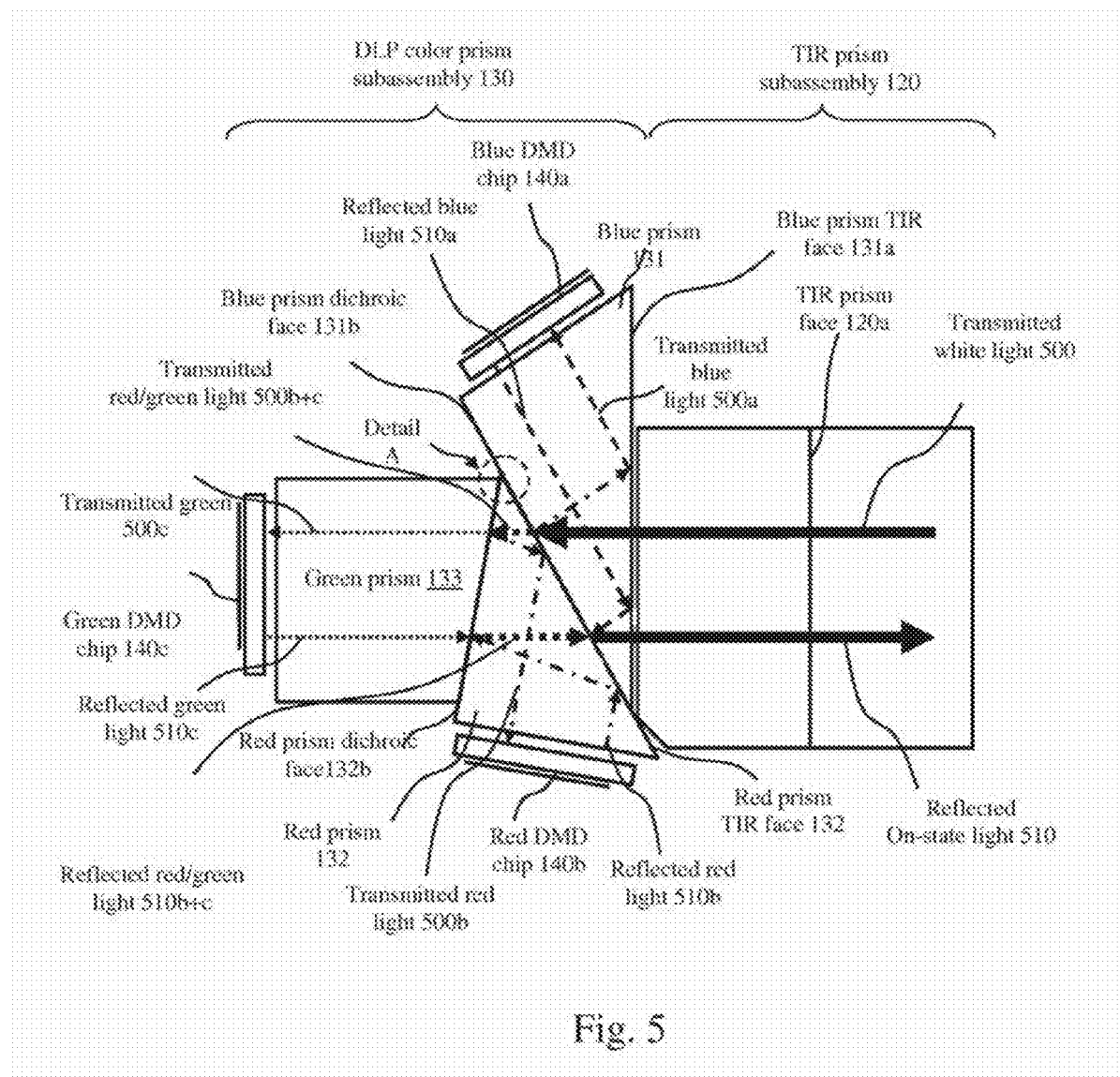
FIG. 5 shows a conventional DLP color prism subassembly combined with a TIR prism subassembly—a basic arrangement that can be used with embodiments of the present invention.
Figure 6:
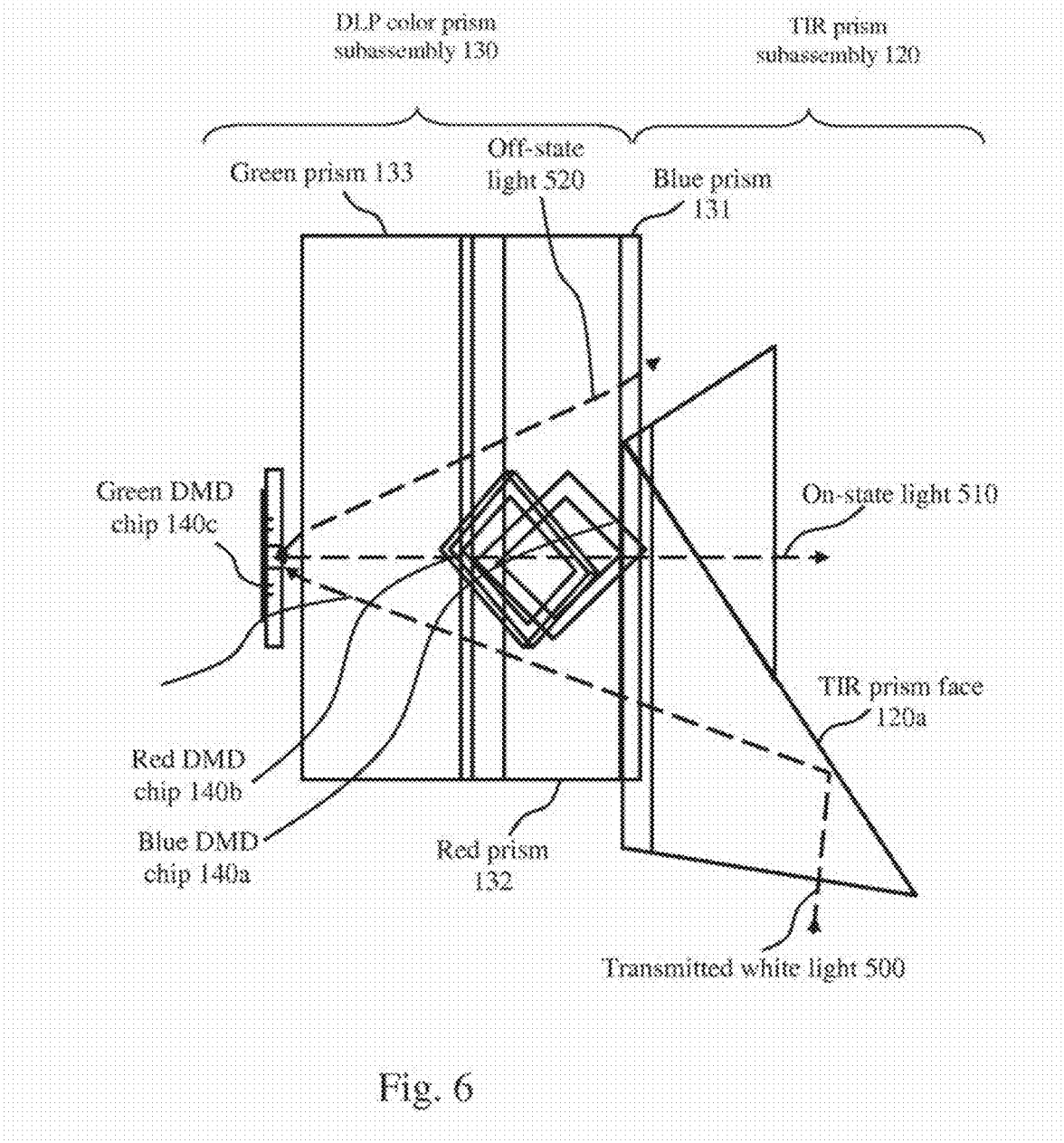
FIG. 6 shows a further conventional DLP color prism subassembly combined with a TIR prism subassembly—a basic arrangement that can be used with embodiments of the present invention.
Figure 7:
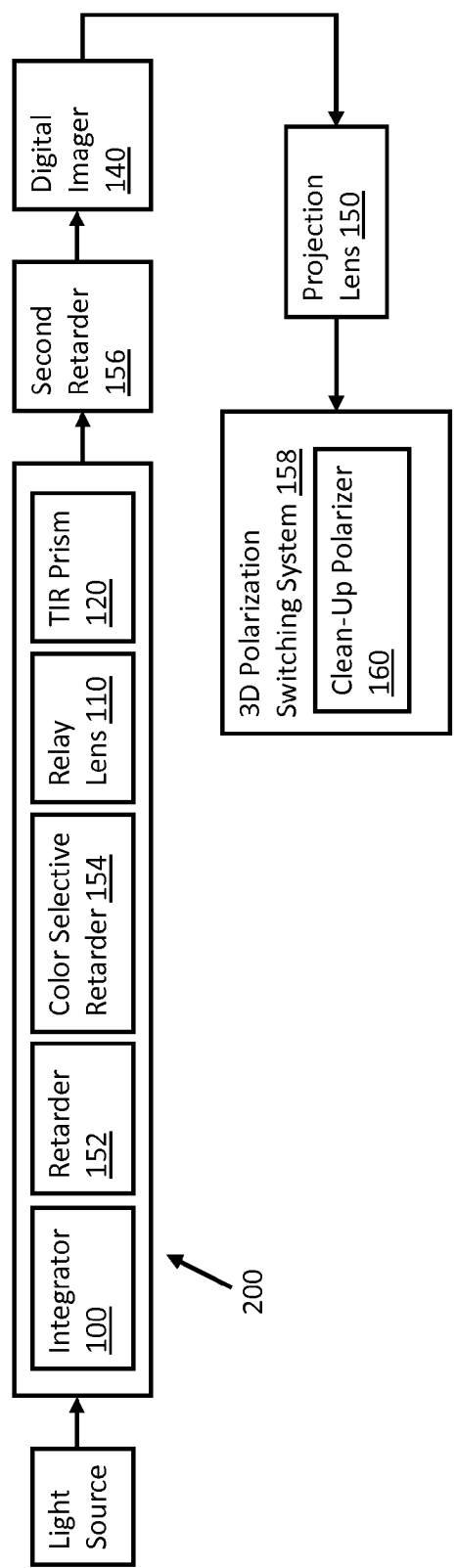
FIG. 7 is a schematic illustration of a DLP projector of an embodiment of the present invention.

As described with respect to FIGS. 3 to 6 and shown in FIG. 7, embodiments of the present invention have a light path through a DLP projector comprising elements from the light source to a projection lens 150. In embodiments the light from the light source is coupled to an optical integrator system 200 which differs in some embodiments from the optical integrator system described above although it can include the same components. For example it includes an optical integrator 100 such as an integrator rod but other integrators are described below such as a fly-eye integrator. At the exit of the optical integrator such as an integrator rod a uniform light spot is achieved. This light spot is then imaged onto the DMD imager or imagers 140 by means of the relay lens system 110. The relay lens system consists of various individual lens elements (in this example 111 till 115 as shown in FIG. 3a) and can optionally also contain 1 or more folding mirrors 116 and an aperture 117 (shown in FIG. 3a—. The TIR prism assembly 120 sends the light towards the digital imager, e.g. DMD imager(s) 140. When a multi-chip architecture is used a color splitting prism 130 can be placed between the TIR prism assembly 120 and the imagers 140. The color prism assembly will split the light in at least 2 spectral components, send it to the respective imager 140 and recombine the at least 2 spectral components into a single output beam towards the projection lens 150.

The different components of the optical path of the embodiments described below affect the polarization properties of the light. Embodiments of the present invention guarantee that the light from the projection lens will also be linearly polarized when the light at the entrance of the optical integrator is linearly polarized.

Embodiments of the present invention are modifications of a projector shown in FIG. 3a in which total internal reflection will occur in the TIR prism assembly 120 and that linearly polarized light can be changed to elliptically polarized light when the polarization direction does not coincide with the s- or p-plane.

Also in embodiments of the present invention, in the color prism assembly 130, multiple TIR reflections can occur. The color prism assembly can include 1 prismatic element per primary color onto which the DMD device 140 for that specific color is attached. For example the color prism can include a prismatic element 131 onto which the blue DMD is attached, a prismatic element 132 onto which the red DMD is attached and a prismatic element 133 onto which the green DMD is attached. The surface of the blue prism 131 adjacent to the red prism 132 can be covered with a dichroic coating that will reflect the blue light and passes the red and green light. The surface of red prism 132 adjacent to the green prism can be covered with a dichroic coating that will reflect the red light and pass the green light. By changing the characteristics of the dichroic coatings a certain prism element can be dedicated to process another color. For example it is possible to define the coatings such the prism element 131 becomes dedicated to the red color and prism element 132 becomes dedicated to the blue color.

Figure 4:
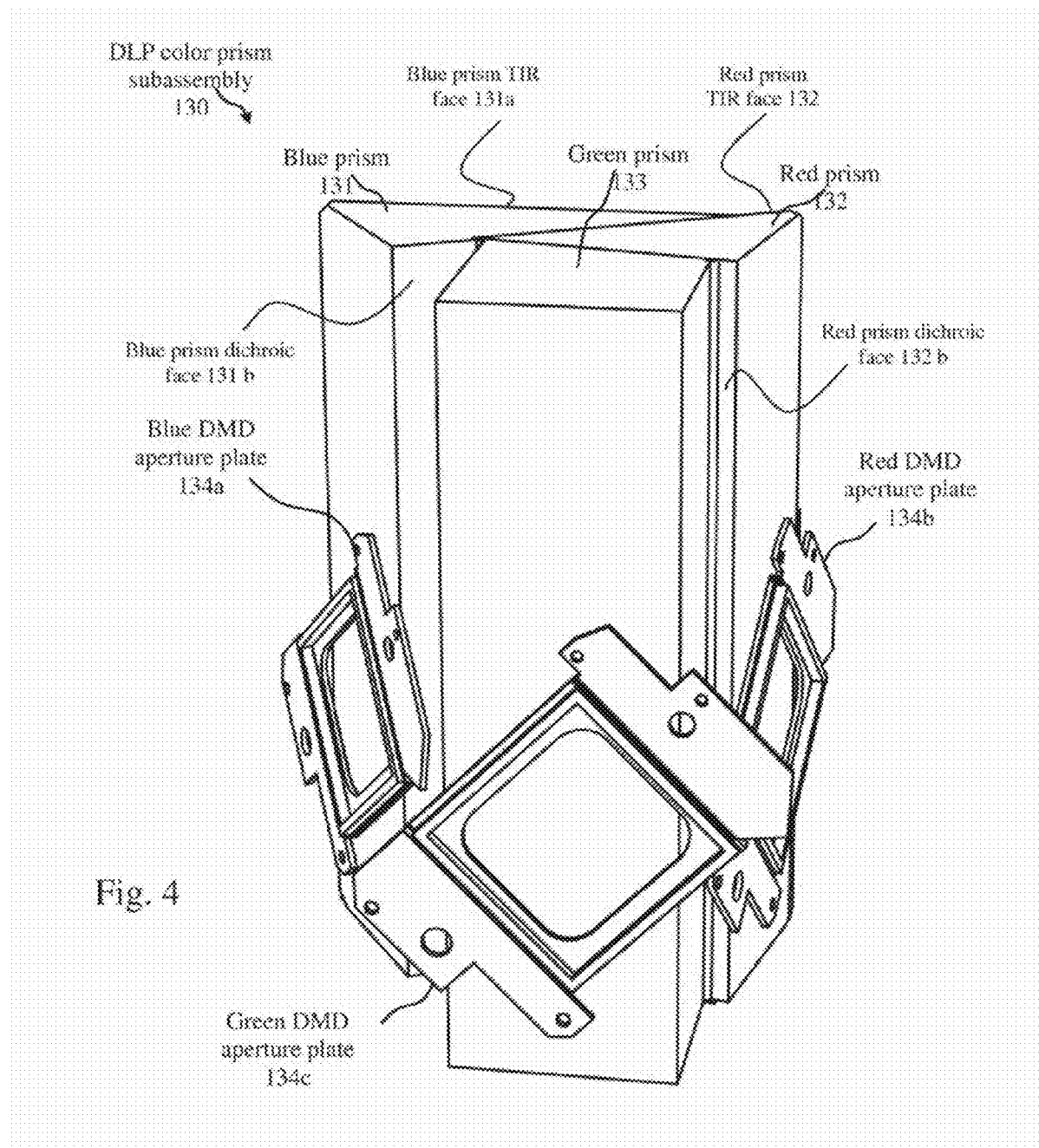
FIG. 4 shows a conventional DLP color prism subassembly—a basic arrangement that can be used with embodiments of the present invention.

With reference to FIGS. 4 to 6 the green light is transmitted through the color prism in a straight path passing through the dichroic coatings on the blue and red prisms at surfaces 131b and 132b. The reflected light follows a similar path. The reflected on-state green light 510c is incident on the dichroic coating surfaces 131b and 132b in a plane perpendicular to those surfaces. Therefore, when the reflected on-state green light 510c is incident on the dichroic coating at surface 132b with linear polarization in the s-plane or p-plane, then this condition will at the same time be met on the dichroic coating at surface 131b and the polarization will remain unaffected. The transmitted green light 500c however passes these dichroic coated surfaces under an angle (as can be seen from the side view of the prism). Embodiments of the present invention defined below compensate for these dichroic coatings converting the polarization state of the transmitted green beam 500c to a general elliptical polarization state.

The blue transmitted light 500a first reflects of the dichroic coating on the surface 131b and then is reflected via TIR on surface 131a, a similar path in reverse order is followed by the reflected blue light 510a. While the plane of incidence for the reflected on-state blue light 510a is perpendicular to the prism surfaces 131a and 131b, the transmitted blue light 500a hits the prism under an angle. Embodiments of the present invention also compensate for the TIR reflection slight changing the polarization the transmitted blue beam 500a.

The red transmitted light 500b first passes through the dichroic coating on the blue prism at surface 131b. It is then separated from the green light by the dichroic coating at surface 132b and reflected by TIR at surface 132a. A similar path in reverse order is followed by the reflected red light 510b. Also here the plane of incidence onto the prism surfaces 131b, 132b and 132a for the reflected on-state red light 510b is perpendicular. While again the transmitted red beam 500b will be incident on those surfaces at an angle. Embodiments of the present invention also compensate for the combination of polarization conversions by the dichroic coating and by the TIR prism.

The above statements that the reflected on-state light 510 hits the respective prism surfaces in a plane perpendicular to those surfaces is only valid for a perfectly collimated transmitted illumination bundle 500. Embodiments of the present invention also compensate when in practical setups having an illumination bundle of a finite f-number (typically f #2.5 for a DMD device with 12 degrees tilt angle) also the reflected on-state light experiences some polarization change.

Embodiments of the present invention can have an advantage to avoid and/or compensate polarization change effects in the optical path of a DLP projector, in order to control the polarization state throughout the projector optical path and obtain substantially linear, e.g. with a tolerance of about +/−10 degrees, or circular polarization at the projection lens. This may require the usage of specific glass types for TIR prism and color prism amongst others. One specific requirement of the glass may be to have low stress birefringence. Not restricting examples of such glass types are Schott SF-57 and Ohara PBH-56.

In some embodiments, with a diverging light beam, linear polarization is best maintained if the input polarization is substantially parallel to one of the symmetry axes of the integrator such as an integrator rod. The polarization with respect to the TIR prism reflective surface however will then not be fully s- or p-polarized, as the orientation of the DLP chip is at 45 degrees with respect to the TIR surface. Also the orientation of the exit of the integrator such as the integrator rod is at 45 degree. As a result the light will become elliptically polarized after passing of the TIR prism. In one embodiment of the present invention it is therefore beneficial to maintain polarization throughout the system by rotating the polarization direction between the exit of the integrator such as the integrator rod and the TIR prism such that the light incident on the TIR prism reflective surface is fully s- or p-oriented. In order to reduce polarization change due to the folding mirror 116, the polarization of the light incident on the folding mirror should preferably also be fully s- or p-oriented. When the plane of folding mirror 116 is perpendicular to the TIR surface then both conditions can be achieved at the same time by placing a broadband half wave retarder in between the exit of the integrator such as the integrator rod and the folding mirror. When using a homogeneous retarder 152, the polarization direction after transmission through the retarder 152 is determined by the orientation of the optical axis of the half wave retarder, hence it should be chosen carefully. For high light intensities a retarder 152 with a sufficiently high optical damage threshold should be selected for example a stack of MgF2 and SiO2.

Alternatively when a fly-eye integrator system is used, the input polarization can be maintained regardless of the orientation versus the symmetry axes of the fly-eye integrator. And it is possible to match the preferred polarization direction of the folding mirror without the use of a retarder 152, simply by controlling the input polarization towards the fly-eye integrator system.

In an embodiment of the present invention at least one broadband retarder 152 is placed between the exit of the integrator such as the integrator rod and the TIR prism such that the polarization at the TIR surface is linear and substantially s- or p-oriented, e.g. with a tolerance of about +/−10 degrees, which is about equivalent with a 5:1 polarization ratio, or the polarization is circular.

Optionally one or more clean-up polarizer(s) 160 can be placed in the light path before and/or after the retarder 152.

When a folding mirror 116 is used then preferably in accordance with an embodiment the at least one retarder 152 is positioned such that also the light incident on the folding mirror is linearly polarized and substantially s- or p-oriented, e.g. with a tolerance of about +/−10 degrees. For example, this can be about equivalent with a 5:1 polarization ratio, especially when the folding mirror uses multilayer dichroic coatings. In absence of such compensation before the folding mirror, the multilayer dichroic coating may introduce additional retardation. If we want the light reaching the TIR surface to be linearly polarized, it will in this case be necessary to compensate this retardation by introducing a well designed retarder before the TIR prism. In case the retardation introduced by the dichroic coating of the folding mirror is wavelength dependent then also the retardation introduced by the compensating retarder has to be wavelength specific.

Alternatively, according to another embodiment of the invention, at least one retarder 152 can be placed in front of or after the projection lens to change the elliptical polarization back to the desired polarization state for instance linear or circular polarization. Optionally a clean-up polarizer 160 can be placed after the retarder 152. In a preferred embodiment a first retarder 152 is used to convert the elliptical polarized light to linear polarized light and a second retarder 156 is used to change the direction of the linear polarization or change it into circular polarization. One of these two retarders 152 may be a homogeneous broadband half wave retarder, the other one may be a homogeneous broadband quarter wave retarder. For high light intensities a retarder 152 with a sufficiently high optical damage threshold should be selected for example a stack of Mg F$_2$ and SiO$_2$.

Alternatively, according to yet another embodiment of the invention, at least one retarder 152 can be placed in between the TIR prism and a digital modulator such as a DMD, such that after the light passes twice through the retarder stack (to the DMD and from the DMD), so that the light before the projection lens is returned to the desired polarization state for instance linear or circular polarization. Optionally a clean-up polarizer 160 can be placed before or after the projection lens. In a preferred embodiment a first retarder 152 is used to convert the elliptical polarized light to linear polarized light and a second retarder 156 is used to change the direction of the linear polarization or change it into circular polarization. Both these retarders 152 may be homogeneous broadband quarter wave retarders. For high light, intensities a retarder with a sufficiently high optical damage threshold should be selected for example a stack of MgF$_2$ and SiO$_2$.

Again, the mentioned retarders 152 are not restricting, non-homogeneous retarders or retarders with a more general retardation value may be chosen. The used retarders may be uniaxial or biaxial.

When in a multi-chip system the TIR prism can be used in combination with a color splitting prism. The color prism can include at least 1 surface with multilayer dichroic coatings as well as several TIR reflecting surfaces. As the incident angle of the light on the dichroic coatings and TIR surfaces is non-perpendicular this will result in that the light entering the color prism with substantially linear polarization will become elliptically polarized. The degree of elliptical polarization will depend on the number of TIR reflections and the dichroic coatings passed under an angle. For example it was found that in a three color configuration where the red segment is placed before the blue segment followed by the green segment, that for red the polarization is still close to linear while for green the polarization is almost circular, with blue somewhere in between.

According to still another embodiment of the invention a color selective retarder stack is placed in between the exit of the integrator such as the integrator rod and the entrance of the TIR prism in order to pre-compensate for the specific retardation caused by the combination of TIR and color prism and achieve a linear s- or p-polarization at the digital modulator such as the DMD device. Optionally a clean-up polarizer 160 can be placed at the digital modulator such as the DMD or further down the light path. For each color selective retarder 154 the retardation of the red, green, and blue wavelength region may differ distinctively. By doing so, the polarization state of the red, green, and blue wavelength region before or after the projection lens can be controlled independently.

According to a further embodiment a color selective retarder stack is placed in front of or after the projection lens to change the elliptical polarization back to the desired polarization state for instance linear or circular polarization. Optionally a clean-up polarizer 160 can be placed after the retarder 152. For each color selective retarder 154 the retardation of the red, green, and blue wavelength region may differ distinctively. By doing so, the polarization state of the red, green, and blue wavelength region before or after the projection lens can be controlled independently.

According to yet another embodiment of the invention at least one retarder 152 can be placed in between a color prism and the digital modulator such as the DMD, such that after the light passes twice through the retarder stack (to the DMD and from the DMD), the light before the projection lens achieves the desired polarization state for instance linear or circular polarization. Per color channel a different retarder is selected such that the different incoming polarizations are converted to the same outgoing polarization. Optionally a clean-up polarizer 160 can be placed before or after the projection lens. In a preferred embodiment a first retarder 152 is used to convert the elliptical polarized light to linear polarized light and a second retarder 156 is used to change the direction of the linear polarization or change it into circular polarization. Both these retarders 152 may be homogeneous broadband quarter wave retarders. For high light intensities a retarder with a sufficiently high optical damage threshold should be selected for example a stack of $MgF_2$ and $SiO_2$. Again, the mentioned retarders are not restricting, not homogeneous retarders or retarders with a more general retardation value may be chosen. The used retarders may be uniaxial or biaxial.

Finally a combination of the above methods is possible wherein part of the compensation is achieved by placing a wide band retarder stack or color selective retarder stack at one position and part of the compensation is achieved by placing a wide band retarder stack or color selective retarder stack at a second and optionally even a third position. For example it can be beneficial to provide a compensation before the TIR prism that only compensates for the retardation of the TIR, in order to make sure that only s- or p-polarized light enters into the color prism, while the retardation of the color prism is compensated at the position between the color prism and the digital modulators such as the DMD devices or at the position of the projection lens. Optionally clean-up polarizer 160 can be placed at one or more positions where the light is linearly polarized. In the above example it would also be possible to provide a clean-up polarizer 160 in between the TIR and the color prism.

The various embodiments of the present invention may be useful in optimization of DLP projectors operated with 3D polarization switching systems, especially in combination with laser light sources. If the light emitted from the projector has a controlled polarization direction adapted to the 3D polarization switching system 158, the light loss in such system can be minimized.

The various embodiments of the present invention may also be useful to increase the picture contrast by inserting a clean-up polarizer 160 in the projected on-state light. For example in front or after the projection lens. This could benefit both 2D and 3D pictures. In case of 3D pictures the clean-up polarizer 160 could also be included in the 3D polarization switching system 158. When a white image is projected, the clean-up polarizer 160 is adapted to match the controlled polarization direction of the projector output and pass substantially all of the light. When a black image is projected, a major part of the light reaching the projection lens will be the result of undesired scattering of light, for example, by the layer beneath the micro-mirrors, imperfections of the optical surfaces, impurities in the coatings of optical surfaces, or dust contamination. Such scattering will no longer maintain the controlled polarization. Therefore, the clean-up polarizer 160 will block a significant part of such scattered light, for example 50% if the scattered light is fully depolarized. The residual brightness in the black image will be reduced and therefore the contrast ratio will substantially increase.

The various embodiments of the present invention may be applicable to single and three chip DLP projector for polarized 3D applications in front or rear projection setups. Applications may include Digital Cinema, Simulation, Home Theatre, and Rental & Staging.

The invention claimed is:

1. A DLP optical structure for use with a digital imager and a projection lens, the DLP optical structure comprising an optical integrator, a relay lens system, and a TIR prism assembly, said optical structure adapted to accept a polarized light beam, said optical structure further comprising:
    at least one retarder positioned after said optical integrator for controlling a polarization state throughout said DLP optical structure, wherein a desired polarization state is substantially linear or circular; and
    a color splitting assembly, wherein said at least one retarder includes at least one color selective retarder, selected to achieve said desired polarization state after said projection lens for all primary colors.

2. The DLP optical structure according to claim 1, wherein said at least one retarder is positioned between the exit of said optical integrator and said TIR prism, and wherein the polarization of said light beam at the TIR prism reflective surface is substantially linear and substantially s- or p-oriented or substantially circular.

3. The DLP optical structure according to claim 2, wherein said at least one retarder is positioned between the exit of said optical integrator and a folding mirror included in said relay lens system, wherein the light incident on said folding mirror has a polarization state that is substantially linear and substantially s- or p-oriented or substantially circular, and wherein the plane of said folding mirror is perpendicular to the surface of said TIR prism.

4. The DLP optical structure according to claim 1, wherein said at least one retarder is placed at a position that is in front of the projection lens for changing an elliptical polarization back to the desired polarization state, said desired polarization state being substantially linear or circular.

5. The DLP optical structure according to claim 1, wherein a first retarder is used to convert elliptical polarized light into linear light, and wherein a second retarder is used to change the direction of said linear polarization or convert it to circular polarization.

6. The DLP optical structure according to claim 5, wherein one of said first and second retarders is a homogeneous broadband quarter wave retarder, and wherein the other one of said first and second retarders is a homogeneous broadband quarter wave retarder or a homogeneous broadband half wave retarder.

7. The DLP optical structure according to claim 1, wherein said at least one retarder is positioned between said TIR prism and said digital imager, and wherein a light beam passes twice through said retarder, and the DLP optical structure is adapted to provide light with said desired polarization state to the projection lens.

8. The DLP optical structure according claim 1, further comprising a color splitting assembly, wherein said at least one retarder is placed between said color splitting prism and said digital imager, wherein said light beam passes twice through said at least one retarder, the DLP optical structure being adapted for achieving said desired polarization state after said projection lens for all primary colors.

9. The DLP optical structure according to claim 1, wherein at least one clean-up polarizer is placed in the path of said light beam before and/or after said at least one retarder.

10. A DLP optical system comprising a DLP optical structure according to claim 1, further comprising a digital imager and a projection lens.

11. A DLP projector comprising a DLP optical system according to claim 10.

12. A DLP projector according to claim 11 further comprising a 3D polarization switching system.

13. A DLP optical structure for use with a digital imager and a projection lens, the DLP optical structure comprising an optical integrator, a relay lens system, a and a TIR prism assembly, said optical structure adapted to accept a polarized light beam, said optical structure further comprising:

at least one retarder positioned after said optical integrator for controlling a polarization state throughout said DLP optical structure;

wherein a desired polarization state is substantially linear or circular;

wherein said at least one retarder is positioned between the exit of said optical integrator and said TIR prism, and wherein the polarization of said light beam at the TIR prism reflective surface is substantially linear and substantially s- or p-oriented or substantially circular and wherein said at least one retarder is positioned between the exit of said optical integrator and a folding mirror included in said relay lens system, wherein the light incident on said folding mirror has a polarization state that is substantially linear and substantially s- or p-oriented or substantially circular, and wherein the plane of said folding mirror is perpendicular to the surface of said TIR prism.

\* \* \* \* \*